US008483719B2

(12) United States Patent
Eitan et al.

(10) Patent No.: US 8,483,719 B2
(45) Date of Patent: Jul. 9, 2013

(54) METHODS AND APPARATUS FOR DETERMINING FEMTO BASE STATION LOCATION

(75) Inventors: Alecsander Eitan, Haifa (IL); Noam Livneh, Misgav (IL)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 12/126,722

(22) Filed: May 23, 2008

(65) Prior Publication Data

US 2008/0299992 A1 Dec. 4, 2008

Related U.S. Application Data

(60) Provisional application No. 60/941,564, filed on Jun. 1, 2007.

(51) Int. Cl.
*H04W 24/00* (2009.01)
(52) U.S. Cl.
USPC .......................... 455/456.5; 455/403; 370/331
(58) Field of Classification Search
USPC ................................ 455/456.5, 403; 370/331
See application file for complete search history.

(56) References Cited

U.S. PATENT DOCUMENTS

| 6,266,534 | B1 * | 7/2001 | Raith et al. ............... 455/456.3 |
| 6,282,427 | B1 * | 8/2001 | Larsson et al. ........... 455/456.2 |
| 7,127,257 | B2 | 10/2006 | Riley et al. |
| 2005/0195109 | A1 * | 9/2005 | Davi et al. ................. 342/463 |
| 2006/0211431 | A1 * | 9/2006 | Mansour et al. ......... 455/456.2 |
| 2007/0002813 | A1 * | 1/2007 | Tenny et al. ............... 370/338 |
| 2007/0105527 | A1 * | 5/2007 | Nylander et al. ......... 455/403 |
| 2010/0067482 | A1 * | 3/2010 | Vikberg et al. ........... 370/331 |

FOREIGN PATENT DOCUMENTS

| JP | 2006504284 A | 2/2006 |
| JP | 2007525093 | 8/2007 |
| JP | 2009504051 | 1/2009 |
| JP | 2009510973 A | 3/2009 |
| TW | 408539 B | 10/2000 |

(Continued)

OTHER PUBLICATIONS

International Search Report and Written Opinion—PCT/US08/065160, International Searching Authority—European Patent Office, Jul. 1, 2009.
Taiwan Search Report—TW097120361—TIPO—Nov. 18, 2011.

*Primary Examiner* — Charles Shedrick
(74) *Attorney, Agent, or Firm* — Howard Seo

(57) ABSTRACT

A system and method for determining the location of a re-deployable base station is disclosed. The disclosed system and method allow for accurate determination of the location of a re-deployable base station, such as a femto base station (FBS), using position information obtained from a mobile station (MS) that is communicating with the FBS being located. The position information can include the location of the mobile device as estimated using one or more satellite positioning systems or cellular network based positioning systems. The position information can also include data identifying pilots from base stations and/or other FBS's that the MS is receiving. A determination of the propagation loss between the MS and the FBS is used to estimate the distance between the mobile device and the FBS. The location of the FBS is determined based on the received position information and the determined distance between the MS and the FBS.

29 Claims, 6 Drawing Sheets

FOREIGN PATENT DOCUMENTS

| | | |
|---|---|---|
| WO | WO 9819481 A2 * | 5/1998 |
| WO | WO0190773 | 11/2001 |
| WO | WO03058985 | 7/2003 |
| WO | WO2005004527 | 1/2005 |
| WO | WO2007015075 | 2/2007 |
| WO | WO2007040454 A2 | 4/2007 |

* cited by examiner

METHODS AND APPARATUS FOR DETERMINING FEMTO BASE STATION LOCATION

CROSS-REFERENCES TO RELATED APPLICATIONS

This application claims the benefit of provisional U.S. Application Ser. No. 60/941,564 filed on Jun. 1, 2007 which is incorporated herein by reference in its entirety for all purposes.

BACKGROUND

1. Field

This disclosure relates generally to communication, and more specifically to a system, method and apparatus for performing location determination of a re-deployable base station using signals from one or more mobile devices and/or non-mobile network equipment.

2. Related Art

Wireless networks provide coverage over wide areas through the positioning of base stations. However, coverage inside buildings can be difficult, especially for broadband wireless services such as high speed data and the like. Short range base stations, which are referred to as Femto Base Stations (FBS) are one possible solution for the coverage problem experienced within buildings. These FBS's can be deployed in areas such as apartment buildings where each FBS can be connected to an individual DSL (digital subscriber line) and/or a cable TV line providing for a broadband internet connection. The FBS can be limited in range as well as limited to be able to provide service to a limited number of mobile devices, e.g., only mobile devices registered to a single customer or a group of affiliated customers such as a small business.

These FBS's are typically installed by the customer without intervention of the cellular operator. Since these FBS units can be connected at numerous locations and can be relocated by the customer at any time, FBS's are a member of a type of base stations known as re-deployable base stations. Unless the FBS units are equipped with a form of position location such as GPS, AGPS and/or a cellular network based trilateration method, the cellular operator would have difficulty managing densely deployed FBS units. An accurate location of these FBS units can be used for purposes of network configuration management, interference minimization and/or billing.

SUMMARY

A system, method and apparatus for determining locations of re-deployable base stations is disclosed. The re-deployable base stations can be used for limited range communication with a select number of wireless communication devices. The re-deployable base stations can provide a link to broadband communications when one of the select communication devices is within range of the re-deployable base station. The re-deployable base station can provide service to non-selected communication devices, e.g. emergency calls. In some aspects, service can be provided to other devices such as, for example, when a person is awarded discounts or benefit points if the person allows other devices to access the re-deployable base station. A network entity can determine the location of the re-deployable base station using a variety of methods described herein.

In one aspect, the disclosure includes a method including communicating with a re-deployable base station over a wireline network, the re-deployable base station being configured to communicate wirelessly with a mobile station, the mobile station being configured to communicate wirelessly with the re-deployable base station. The method further includes obtaining information indicative of a position of the mobile station, and estimating a position of the re-deployable base station based on the obtained position information.

In another aspect, the disclosure includes a network controller including a receiver configured to communicate with a re-deployable base station over a wireline network, the re-deployable base station being configured to communicate wirelessly with a mobile station, the mobile station being configured to communicate wirelessly with the re-deployable base station. The network controller further includes a processor coupled to the receiver and configured to obtain information indicative of a position of the mobile station, and a position estimation module coupled to the processor, the position estimation module configured to estimate a position of the re-deployable base station based on the obtained position information.

In still another aspect, the disclosure includes a network controller including means for communicating with a re-deployable base station over a wireline network, the re-deployable base station being configured to communicate wirelessly with a mobile station, the mobile station being configured to communicate wirelessly with the re-deployable base station. The network controller further includes means for obtaining information indicative of a position of the mobile station, and means for estimating a position of the re-deployable base station based on the obtained position information.

In still another aspect, the disclosure includes a computer readable medium encoded with computer executable instructions for executing a method, the method including communicating with a re-deployable base station over a wireline network, the re-deployable base station being configured to communicate wirelessly with a mobile station, the mobile station being configured to communicate wirelessly with the re-deployable base station, obtaining information indicative of a position of the mobile station and estimating a position of the re-deployable base station based on the obtained position information.

In yet another aspect, the disclosure includes a method of locating a re-deployable base station, the re-deployable base station being part of a wireless network and being configured to provide service to a limited number of mobile stations. The method of this aspect includes transmitting a position fix command to one of the mobile stations and, subsequent to transmitting the position fix command, receiving information indicative of the location of mobile station. The method further includes determining an indication of an amount of propagation loss between the mobile station and the re-deployable base station, and estimating the position of the re-deployable base station based on the received information and the determined propagation loss.

BRIEF DESCRIPTION OF THE DRAWINGS

The features, objects, and advantages of aspects of the disclosure will become more apparent from the detailed description set forth below when taken in conjunction with the drawings, in which like elements bear like reference numerals.

DETAILED DESCRIPTION

Figure 1:
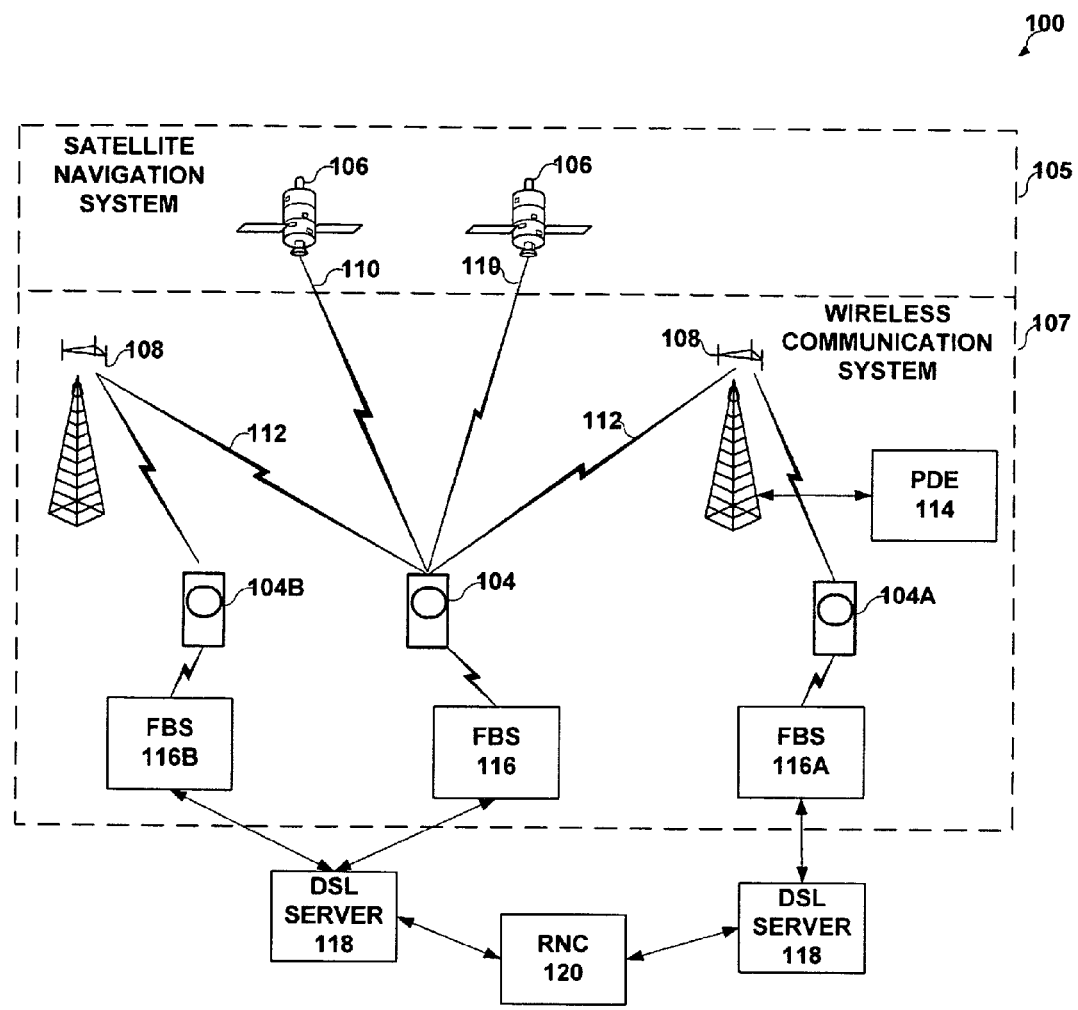
FIG. 1 is a block diagram illustrating an example system in which re-deployable base stations can be located using position information obtained from other devices.

The word "exemplary" is used exclusively herein to mean "serving as an example, instance, or illustration." Any aspect described herein as "exemplary" is not necessarily to be construed as preferred or advantageous over other aspects.

The method and apparatus described herein may be used with various satellite positioning systems (SPS), such as the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

Position determination techniques described herein may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

As used herein, a mobile station (MS) and user equipment (UE) each refers to a device such as a cellular or other wireless communication device, personal communication system (PCS) device, personal navigation device, laptop or other suitable mobile device capable of receiving and processing SPS signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

FIG. 1 is a block diagram illustrating an example SPS Environment 100. SPS environment 100 may comprise a Satellite Navigation System 105 and a Wireless Communication System 107. An example of Satellite Navigation System 105 is the Global Positioning System (GPS) developed by the Unites States Department of Defense. Other types of satellite navigation systems 105 include the Wide Area Augmentation System (WAAS), the Global Navigation Satellite System (GLONASS) deployed by the Russian Federation, and the Galileo system planned by the European Union.

In one aspect, the mobile station (MS) 104 employs techniques to compute a position solution based on signals 110 and/or 112 received from the satellites 106 and base stations 108, respectively. The MS 104 acquires signals 110 from satellites 106 in view, and measures distance from each satellite by measuring the time required for each signal to travel from the respective satellite to the MS 104. Similarly, the MS 104 receives signals 112 from the base stations 108 of the Wireless Communication System 107, and measures distances from the base stations 108 according to the time required for each wireless signal 112 to travel from the base stations 108 to the MS 104. The MS 104 resolves position and time variables based on the measurements or communicates the measurements to Position Determination Entity (PDE) 114, which then determines a position solution for the MS 104. Multiple user applications, including navigation and other value added applications, may be executed on the MS 104 or other entities (not shown) of Wireless Communication System 107. In some aspects, the wireless communication system 107 employs position determination methods to determine the location of mobile stations without the mobile station performing any position determination functions.

The Wireless Communication System 107 also includes Femto Base Stations (FBS) 116, 116A and 116B. An exemplary three FBS units are illustrated in FIG. 1, but any number and type of re-deployable base stations can be utilized. FBS units can be configured to transmit (and receive) over a limited coverage area such as within an apartment, room, area of a building etc. FBS units can also be configured to provide access to a backhaul network connection for a limited number of MS's 104. For example, in FIG. 1, FBS 116 can be configured to provide access to the backhaul network only for MS 104, while FBS 116A can be configured to provide service only to MS 104A and FBS 116B can be configured to provide service only to MS 104B. Authentication and authorization techniques utilizing encryption with private and/or public keys are examples of methods of limiting access to a limited number of MS's 104 for certain FBS units 116. In situations where an unauthorized MS 104 attempts to gain access via an FBS 116, the FBS 116 can send a text message to the unauthorized MS 104, the message stating, for example, "you cannot get service via this FBS."

The FBS units 116 can communicate with the MS 104 utilizing the same communication methods as the MS 104 uses to communicate with the base stations 108. The MS 104 can utilize the same protocol when communicating with the FBS 116 or the base station 108. Alternatively, the FBS units 116 can utilize a different wireless protocol for communicating with the MS 104. For example, the MS 104 can utilized a cellular protocol such as Cdma2000 for communicating with the base stations 108, and can utilize a short range wireless protocol such as 802.11x or Bluetooth for communicating with the FBS units 116.

The FBS units 116 can be configured to communicate with DSL (digital subscriber line) servers 118, or alternatively with cable TV servers or any other type of server providing digital communications capabilities. The DSL servers 118 can be configured to receive and forward communications from multiple FBS units 116 such as the server 118 illustrated as communicating with FBS units 116 and 116B. As used herein, the DSL servers 118 can utilize one or more technologies including, for example, DSL, ADSL, VDSL, HDSL or other digital subscriber loop technologies. These technologies may utilize copper lines between a house or office building and a Central Office, e.g., the so called last mile links serving as a backhaul connection. In addition, the term DSL can also include cable television lines.

The DSL servers 118 are connected to a radio network controller (RNC) 120. The RNC 120 is used to control data being communicated to and from the DSL network back to the Wireless Communication System 107. The RNC 120 can be the governing element in, for example a WWAN responsible for control of the base stations 108 (or Node Bs), that is to say the base stations 108 and FBS's 116 which are connected to the RNC 120. The RNC 120 carries out radio resource management, and some of the mobility management functions. The RNC 120 connects to the typically circuit switched network, e.g., the DSL network, through a Media Gateway (MGW), not shown, and to a base station controller in a packet switched WWAN.

The RNC 120, or other network entity such as the DSL server 118, or the FBS 116, can use methods disclosed herein for determining locations of the re-deployable FBS units 116. When a number of FBS units 116 are installed in close proximity, as may exist in an apartment building or office building, a small multi base-station cellular system is created but without the normal consideration for the location of the base stations. Individual MS's may try to place calls when located in places where the FBS to which they are associated is not the best FBS 116 (or alternatively a base station 108) for service. However, as a result of a lack of knowledge of the location of the FBS units 116, handover (HO) may not occur and the performance of the cellular network 107 could be disrupted, or the capacity of the system could be reduced due to creating an unnecessary amount of interference and excess transmission power. Some calls which could have been easily supported by the deployed network of the FBSs could be dropped because of the lack of proper handover capability. Soft HO would also be impossible under the above mentioned restrictions.

The dense deployment of the FBS's 116 and the lack of deployment planning can benefit from the use of efficient configuration and adjustments algorithms, by the RNC 120, for example, to minimize the interferences and enable effective handoff between the FBS 116 and the base stations 108 of the macro cellular network 107. These algorithms can take advantage of the knowledge of the FBS locations afforded by the methods and apparatus disclosed herein. In addition, the cellular operator can make use of accurate FBS location for billing and pricing purposes.

The Wireless Communication System 107 and the backhaul system including the DSL Servers 118 and the RNC 120 are simplified examples and are not meant to portray actual system configurations. For example, all base stations 108 are typically connected to an RNC such as the RNC 120. However, an RNC that is connected to an FBS 116 would probably be different from an RNC connected with a base station 108. In addition, RNC's are typically connected via a backhaul network to central servers. Further, the PDE 114 is shown as being connected with a single base station 108 in FIG. 1. More typically the PDE 114 will be located in the wireless operator's core network and be connected to several base stations 108 and/or FBS's 116. There can also be more than one PDE 114 in a network which are connected to different base stations 108 and/or FBS's 116. A description of exact network topology is not needed to understand the systems, apparatus and methods described herein.

Figure 2:
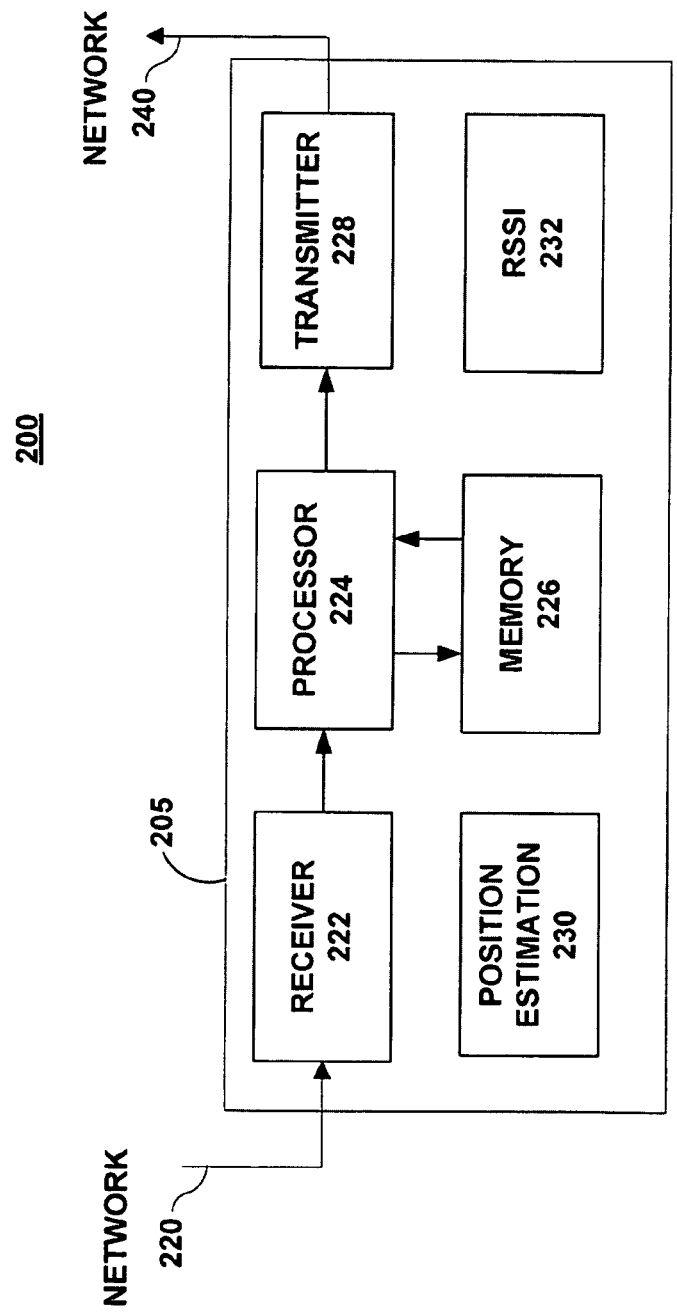
FIG. 2 is a functional block diagram of an example of an apparatus for locating the position of a re-deployable base station.

FIG. 2 is a functional block diagram of an example of a system for locating the position of a re-deployable base station such as, for example, the FBS unit 116. The system 200 includes a network controller subsystem 205. The network controller subsystem 205 may be part of the RNC 120, the DSL server 118 and/or the FBS unit 116. The various modules of the network controller subsystem 205 can be distributed among one or more of the RNC 120, the DSL server 118 and the FBS unit 116 as well as other apparatus not shown.

The network controller 205 includes a receiver module 222 that is configured to receive data over a network 220. The network 220 can include one or more wireline and/or wireless networks. In one aspect, the network 220 is a wireline DSL network and the data received over the network 220 is communicated by one or more of the FBS 116, the DSL server 118 and the RNC 120 as illustrated in the example system 100 of FIG. 1. In another aspect the network 220 is a wireless network such as the wireless network 107 and the data received over the network 220 is communicated by one or more of the MS 104, or other wireless devices not shown.

The network controller 205 includes one or more processors 224. The processor 224 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other electronic units, or a combination thereof. The processor 224 is configured to store data received by the receiver 222 and process and store the data on a memory 226. The memory 226 can be implemented within the processor 224 or external to the processor 224. As used herein, the term memory refers to any type of long term, short term, volatile, nonvolatile, or other memory and is not to be limited to any particular type of memory or number of memories or type of media upon which memory is stored.

The processor 224 is also configured to perform instructions for executing the methods of a position estimation module 230 and a received signal strength indication (RSSI) module 232. The modules 230 and 232 can include firmware and/or software implementations of the methodologies discussed below in reference to FIG. 3. In the case of software implementations, the software code of the modules 230 and 232 can be stored on the memory 226.

The position estimation module 230 is configured to determine, based on various position information received over the network 220, the location of one or more re-deployable base stations such as, for example, the FBS unit 116 of FIG. 1. In one aspect, the position information comprises position information derived by a MS 104 in communication with the FBS unit 116, where the MS 104 utilizes one or more SPS or cellular network based position determination systems. In these aspects, the location of the FBS can be refined by receiving multiple position information signals from one or more MS 104 in communication with the FBS 116. For example, a single MS 104 may be polled multiple times for position information in order to combine the estimates, possibly resulting in a more accurate position estimation. In addition, multiple MS 104 may be polled and their position information combined to improve accuracy.

In another aspect, the position information received and utilized by the position estimation module 230 comprises information identifying one or more base stations 108, and/or other FBS units 116 that are within communication range of the FBS unit 116 being located or within communication range of a MS 104 that is communicating with the FBS unit 116 being located. In this aspect, a network database containing locations of static base stations 108 and/or containing recent estimations of the locations of the re-deployable FBS units 116 can be used to for position estimation by the position estimation module 230. The base stations being identified need not be resident to the wireless network 107 that is serving the MS 104 and/or the FBS 116. In other words, if the MS 104 and/or the FBS 116 is capable of receiving pilot signals from another wireless network, e.g., GSM, TDMA, or others, then the base station identifiers and locations contained in the appropriate databases can be used for obtaining the position information.

In some aspects, the position estimation module 230 can make use of propagation loss measurements that are determined by the RSSI module 232. The RSSI module 232 can receive information from the FBS unit 116 indicative of the signal strength loss that one or more MS 104, base stations 108 or other FBS units 116 are experiencing in communication with the FBS unit 116 being located. These propagation loss measurements can be used by the position location module 230 to further refine the location estimation. Details of methods of utilizing the propagation loss measurements determined by the RSSI module 232 are discussed below.

In one aspect, the RSSI module 232 receives information indicative of a signal power transmitted by the FBS 116 being located and also receives information indicative of a signal power received at the MS 104 that is communicating with the FBS 116. In this aspect, the difference between the transmitted power and the received power (less any significant antennae gains, for example) can be used to estimate a distance between the transmitting and receiving devices.

The network controller 205 also contains a transmitter module 228 that is configured to transmit data over a network 240. The network 240 can include one or more wireline and/or wireless networks. In one aspect, the network 240 is a wireline DSL network and the data transmitted over the network 240 is communicated by one or more of the FBS 116, the DSL server 118 and the RNC 120 as illustrated in the example system 100 of FIG. 1. In another aspect the network 240 is the a wireless network such as the wireless network 107 and the data transmitted over the network 240 is communicated to one or more of the MS 104, or other wireless devices not shown. In one aspect, a request for a position fix of an FBS 116 and/or a MS 104 can be transmitted over the network 240. Details of functions performed by the various modules of the network controller 205 will now be discussed.

Figure 3:
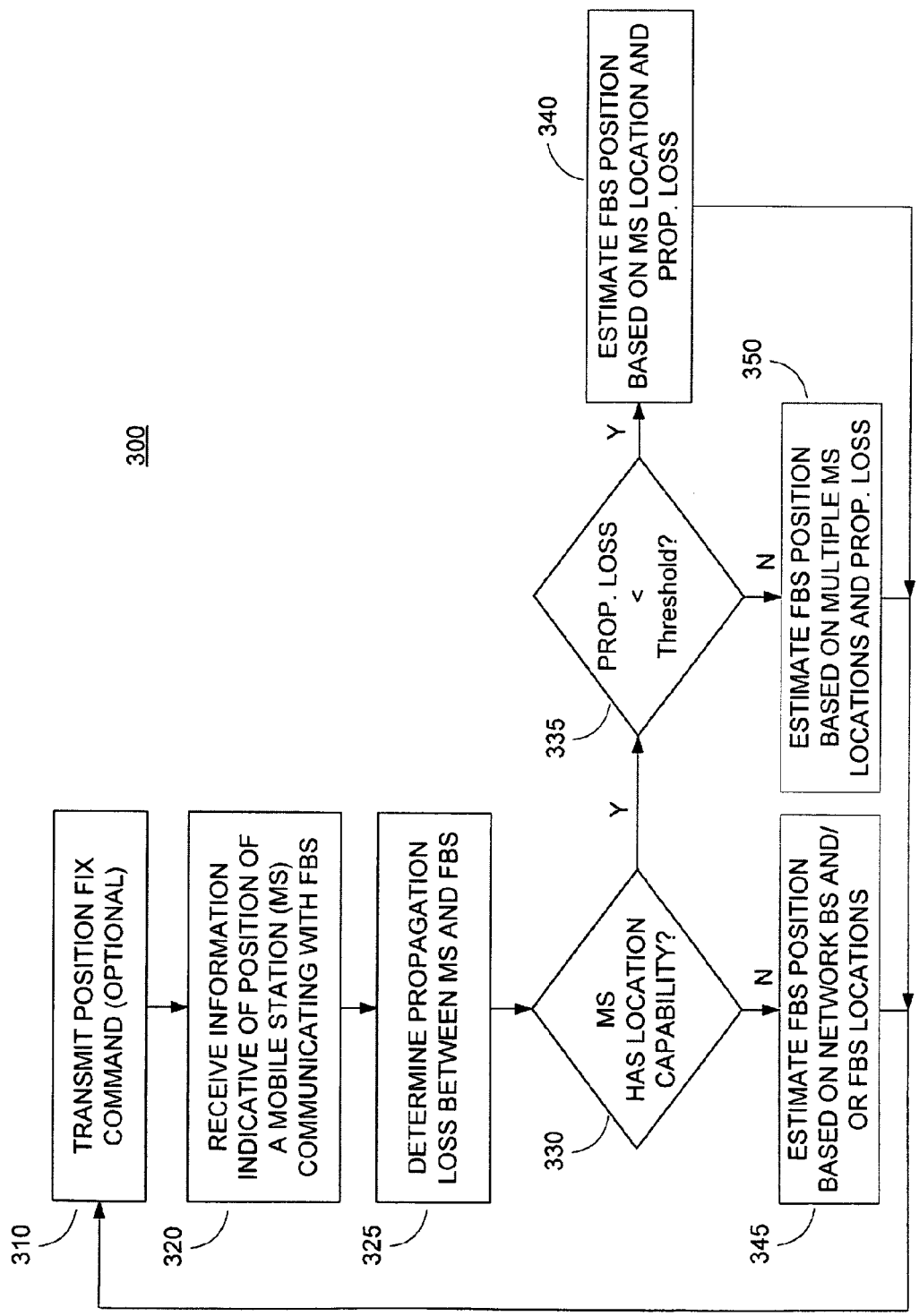
FIG. 3 is a flowchart illustrating an example of a method for determining a position of a re-deployable base station.

FIG. 3 is a flowchart illustrating an example of a method for determining a position of a re-deployable base station. The process 300 can be executed, for example, on the system 100 or the system 200 of FIGS. 1 and 2, respectively. For example, the process 300 can be executed on one or more of the FBS 116, the DSL server 118 and the RCN 120, or on any other device that has access to the network(s) illustrated in FIGS. 1 and 2 respectively.

In one aspect, the process 300 starts at optional block 310. At block 310, the system can transmit a position fix command to one or more re-deployable base stations, e.g., the FBS units 116, for which a location estimation is desired. Alternatively, the system can transmit a position fix command to one or more MS 104 that is in communication with, or in the vicinity of, the FBS 116 for which the location estimation is desired. For example, the RCN 120, or DSL server 118 can transmit a position fix command to the FBS 116 which, in turn, can communicate a position fix command to the MS 104. In another aspect, the FBS 116 and or the MS 104 can be configured to automatically initiate the position fix process at a pre-determined time and/or interval. In this aspect, no position fix command needs to be transmitted at the optional block 310. The transmitter 228 of the network controller 205 in FIG. 2 can perform the functions at the optional block 310.

Once the position fix process has been initiated, either because the position fix command was transmitted at block 310 or because of predetermined schedule, the process 300 proceeds to block 320. At block 320, the system receives information indicative of a position of an MS in communication with the FBS 116. In one aspect, the information can be the position of the MS 104 that is communicating with the FBS for purposes of utilizing the backhaul network with which the FBS is connected. In another aspect, the information can be related to the identity of a base station 108, and/or another FBS 116 that may not be directly communicating with the FBS 116, but is transmitting a pilot signal that can be received by the FBS 116 or the MS 104. In aspects where the position information received at block 320 identifies another FBS 116, a previous position estimated for that FBS 116, using the process 300, for example, can be used as an estimate of the other FBS's position (assuming that the other FBS has not recently been re-deployed).

In one aspect, the position information received at the block 320 is position information received from a MS 104 that is configured to receive signals from an SPS 105 such as GPS, AGPS, Galileo and others. In another aspect, the position information is position information received from a MS 104 that is part of a network based positioning system. In either of these aspects, the position information obtained at block 320 locates the MS 104 in a coordinate system of the SPS 105 or the cellular network positioning system being utilized by the MS 104. In some aspects, the position information can include error or uncertainty tolerances, also known as dilution of precision parameters. The receiver 222 of the network controller 205 in FIG. 2 can perform the functions at the block 320.

Since the position information received at the block 320 is based on the location of another wireless device other than the FBS 116 being located, a measure indicative of the propagation loss of a signal between the MS 104 and the FBS 116 is determined at block 325. The measure indicative of propagation loss can be an indicator of the distance between the devices in certain situations. In one aspect, the FBS 116 transmits a signal of a known power level to the MS 104. The MS 104 then transmits a response to the FBS 116, the response signal containing a received signal strength indicator (RSSI) measurement. The RSSI is subtracted from the known transmitted power level to determine the propagation loss. In some aspects the antennae gain of the FBS 116 and/or the MS 104 can also be subtracted from the transmitted power level to improve accuracy. For example, if the FBS has an antennae gain of about 2 dB or greater, the antennae gain and RSSI can be subtracted from the transmitted power level to determine the propagation loss.

The propagation loss can be used (see discussion in reference to decision block 335 and FIG. 4 below) to determine an estimated distance that the FBS 116 is located from the MS 104. The propagation loss or the resulting estimated distance between the MS 104 and the FBS 116 can be used to determine the method used to estimate the position of the FBS 116, as discussed below. The RSSI module 232 of the network controller 205 in FIG. 2 can perform the functions at the block 325.

The position of the FBS 116 can be estimated in different ways depending on the type of position information received at the block 320, and depending on the level of the propagation loss determined at the block 325. The process 300, for example, can estimate the position of the FBS 116 using one of the three methods at blocks 340, 345 and 350. In some aspects, two or more of the estimates at the blocks 340, 345 and 350 can be combined to refine the position estimation of the FBS 116. Which estimation method (or methods) is used, in this example, depends on whether the MS 104 that is in communication with the FBS 116 has location capability (see decision block 330), and on whether the propagation loss is greater than a threshold (see decision block 335). Details of the functions performed to estimate the position of the FBS 116 at the blocks 340, 345 and 350, depending on the results of decision blocks 330 and 335, will now be discussed.

At the decision block 330, it is determined whether the MS 104 in communication with the FBS 116 has position location capability (e.g., based on the type of position information received at the block 320, in one aspect). Location capability can be an SPS such as GPS, AGPS and the like, or a cellular network based system (which may include trilateration and/or SPS portions). If the MS 104 is determined to have position location capability, the process 300 continues to decision block 335. If the MS 104 is determined not to have position location capability, the process 300 continues to block 345. The functions performed
at the block 345 are discussed below.

In one aspect, if the position information received at the block 320 contains an estimate of the position of the MS 104, then the process continues to block 335. In another aspect, the determination, at the decision block 330, of whether or not the MS has location capability can include determining the make and model of the MS 104. This can be accomplished by performing a query of the International Mobile Equipment Identity or IMEI number of the MS 104. Knowing the IMEI number, the FBS 116 can look up the capabilities associated with the particular make and model of the MS 104. In another aspect, a service discovery protocol can be performed between the MS 104 and the FBS 116. The determination block 330 can, in some aspects, be performed prior to performing the functions at the blocks 310 and 320. In these aspects the functions performed at the blocks 310 and 320 depend on the position capabilities that the MS is determined to have.

If it is determined at decision block 330, that the MS 104 has location capabilities, the process 300 continues to decision block 335. At decision block 335, the propagation loss determined at the block 325 is compared to a threshold. If the propagation loss is less than the threshold (an indication that the distance between the MS 104 and the FBS 116 is small), than the process proceeds to block 340 to estimate the position of the FBS 116. If the propagation loss is greater than or equal to the threshold, the process continues to block 350 to estimate the position of the FBS 116. The estimation functions performed at the block 340 can be simpler than the function performed at the block 350 since the position of the FBS 116 and the MS 104 are closer.

Figure 4:
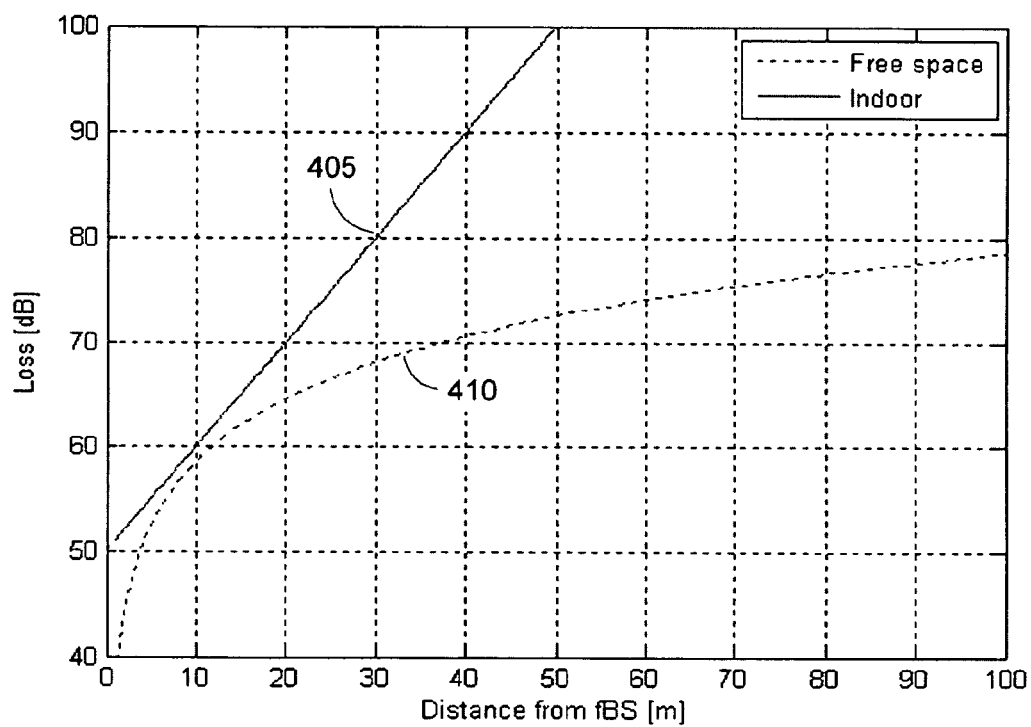
FIG. 4 is an example set of curves showing theoretical relationships of distance versus signal loss for a signal transmitted between a re-deployable base station and a mobile device.

The propagation loss threshold value used at the decision block 335 can be based on one or more models of signal strength loss. FIG. 4 is an example set of curves showing theoretical relationships of distance versus signal loss for a signal transmitted between a re-deployable base station and a mobile device. Curve 405 depicts an indoor propagation loss model of the form:

$$\text{LOSS[dB]}=50+1\text{ dB}*R[\text{meters}] \quad (1)$$

where R is the distance between the transmitting and receiving devices. Curve 410 depicts a free space model.

Since FBS's are typically used indoors, the curve 405 can be used in some aspects for determining an acceptable propagation loss threshold to be used at decision block 335. For example, if the threshold at block 335 were about 70 dB, then the curve 405 indicates that the distance between the MS 104 and the FBS 116 could be less than about 20 meters. This may be accurate enough for network management purposes. More accuracy could be obtained by setting the threshold to values of about 60 dB (10 meters), 62 dB (12 meters), 64 dB (14 meters), 66 dB (16 meters), or 68 dB (18 meters). The threshold could also be set to values equal to about ±1 dB of these threshold values.

If the FBS 116 to be located is in a free space environment, the curve 410 could be used to determine the threshold. For example, if it is desired that the threshold correspond to a distance of 20 meters, the threshold could be chosen to be about 64 dB using curve 410. If more accuracy is desired, the threshold value could be set to about 62 dB (about 16 meters), 60 dB (about 12 meters), or 58 dB (about 10 meters). The threshold could also be set to values equal to about ±1 dB of these threshold values. In some aspects, the propagation loss models can also be derived to take into account antennae gains for the MS 104 and/or the FBS 116. In some aspects, the decision block 335 could compare the estimated distance from MS 104 to the FBS 116 to a threshold and if the distance is less than the threshold, proceed to block 340, otherwise, proceed to block 350.

In addition to curves 405 and 410, other path loss models could be used to determine the threshold used at decision block 335. Path loss models such as Hata models, for example, could be used for modeling urban settings. Other path loss models could also be used for determining the propagation loss threshold used at decision block 335. The position estimation module 230 of the network controller 205 in FIG. 2 can perform the functions at t the decision blocks 330 and 335.

If the MS 104 was determine to have location capabilities (at block 330) and if the propagation loss was determined to be less than the threshold at block 335, the position of the FBS 116 is determined at the block 340. In one aspect, the location determined for the FBS at the block 340 is simply the location of the MS 104 that was received at block 320. This may be adequate if the threshold value used at block 335 equates to transmit distances of about 5 meters, 10 meters, 20 meters, or any other distance determined to be satisfactory.

In one aspect, only one position estimation at block 340 is performed. In another aspect, the process 300 returns to block 310 to obtain another position fix of the MS 104 to improve the accuracy of the estimation at block 340. In this aspect, the propagation losses can be used to determine a radius of uncertainty (equal to the distance determined by one or more of the propagation models discussed above) that is drawn around each of the MS positions obtained for each position fix. In this way, the multiple regions can be used to average (or determine a most likely value) the estimated positions and thereby improve the confidence in the position estimation of the FBS 116.

Figure 5:
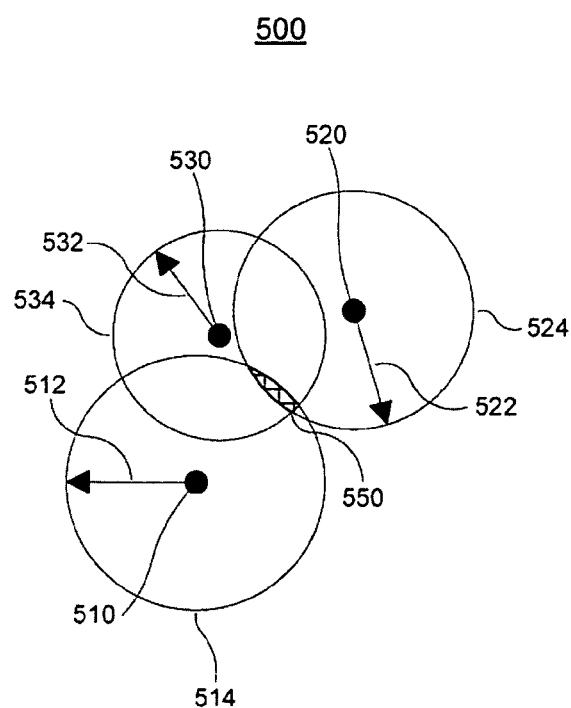
FIG. 5 illustrates a simplified example of multiple position fixes and multiple radii of uncertainty that can be used to determine the position of a re-deployable base station.

FIG. 5 illustrates a simplified example of multiple position fixes and multiple radii of uncertainty that can be used to determine the position of a re-deployable base station. The simplified example of FIG. 5 utilizes circles, but a more general method, discussed below in reference to FIG. 6, utilizes error ellipses. The error ellipses can include uncertainties due to dilution of precision as well as an estimated distance between the MS 104 and the FBS 116. The constellation 500 of position locations includes three estimated locations 510, 520 and 530 corresponding to three MS 104 locations. In other embodiments, discussed below, the locations 510, 520 and 530 could also be the locations of other wireless devices such as base stations 108, FBS's 116 or any other wireless device with location information available to be obtained (at the block 320 in the process 300). The three locations can be locations of different MS's, or locations of the same MS obtained at different times, or a combination thereof.

For each of the locations 510, 520 and 530, a propagation loss estimate was determined at the block 325. These propagation loss estimates can be used to estimate the distance from the MS 104 to the FBS 116 at each of the positions. In this example, radii 512, 522 and 532 were determine to be the estimated distances between the MS 104 and the FBS 116 for the positions 510, 520 and 530, respectively. The distances can be calculated using path loss curves similar to curves 405 and 410 of FIG. 4, or using any other path loss curve deemed to be representative of the environment in which the devices are located.

The radii 512, 522 and 532 can be used to draw circles 514, 524 and 534 around the positions 510, 512 and 522, respectively. The circles 514, 524 and 534, in this example, all overlap at an area 550 (shown as a cross-hashed) area. Using trilateration methods, the location of the FBS can be estimated in the area 550.

The example shown in FIG. 5 has a fairly small overlap area 550. However, in some circumstances, erroneous positions and/or erroneous distance estimations can result in rather large overlap areas, or even multiple overlap areas, making the position estimation of the FBS 116, less reliable. In one aspect, additional position fixes can be performed until a confidence level is reached (e.g., when the overlap area is smaller than a threshold). Since FBS's are not expected to move frequently, there may be hours, days or even weeks to calculate a reliable position. Other methods can also be employed to improve the accuracy of the position estimation of the FBS 116 at the block 340. For example, for cases where more than one overlap area exists, each overlap area may be ranked according to the number of measurements that overlap it and the area with the largest number can be chosen. Also, methods similar to those discussed below in reference to FIG. 6 may be used at the block 340 to include dilution of precision error estimates (e.g., error ellipses) common to SPS systems.

For cases where the propagation loss is greater than the threshold at the decision block 335, the position of the FBS 116 is estimated at the block 350. In general, the position estimation at the block 350 is more complex than the position estimation that was performed at the block 345. This is due to the larger uncertainty in using the position of more distant MS's to estimate the position of the FBS. In one aspect, the position of the FBS 116 is estimated using two or more positions for one or more MS's that have been obtained at the block 320. In one aspect, the corresponding propagation losses determined at the block 325 are used to estimate the distance between the MS's and the FBS, and the FBS position is estimated using methods similar to those discussed in reference to FIG. 5.

In another aspect, error ellipses are used to model a position dilution of precision for the MS positions obtained from SPS's such as GPS, AGPS, WAAS, GLONASS, Galileo and others. An error ellipse defines a confidence region where the MS 104 could be located, with the center of the ellipse being the estimated MS 104 position. Error ellipses can be increased in size to achieve a desired confidence level. For example, a standard error ellipse (having semi-major and semi-minor axes based on a single standard deviation) have a 39% probability of containing the MS 104. Multiplying the semi-major and semi-minor axes by 2.45 results in a 95% probability of the MS 104 being contained in the error ellipse.

Figure 6:
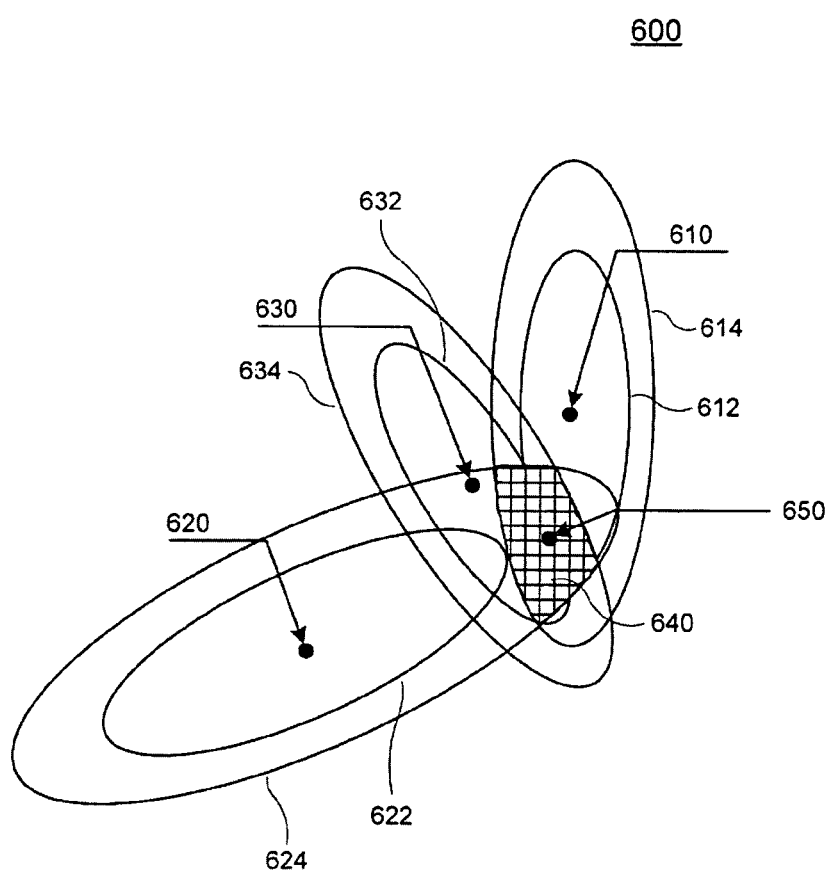
FIG. 6 is an illustration of a method of using multiple instances of mobile device positions and signal loss measurements for estimating the location of a re-deployable base station using error ellipses.

FIG. 6 is an illustration of a method of using multiple instances of mobile device positions and signal loss measurements for estimating the location of a re-deployable base station using error ellipses. In the example illustrated in FIG. 6, the error ellipses representing the position dilution of precision is increased by a factor (or a set of factors) to include the MS 104 to FBS 116 estimated distances between the MS(s) 104 and the FBS 116 being located. In this example, a constellation of 3 position fixes and corresponding ellipses are illustrated, but the same method could apply using two positions or more.

The constellation 600 of position locations includes three estimated locations 610, 620 and 630 corresponding to three MS 104 locations. In other embodiments, discussed below, the locations 610, 620 and 630 could also be the locations of other wireless devices for which error ellipses are available to be obtained (at the block 320 in the process 300). The three locations can be locations of different MS's, or locations of the same MS obtained at different times, or a combination thereof.

Each position 610, 620 and 630 is surrounded by an error ellipse 612, 622 and 632, respectively. The error ellipses 612, 622 and 632 represent the confidence regions, taking into account dilution of precision, for the MS position estimation points 610, 620 and 630, respectively. These dilution of precision error ellipses 612, 622 and 632 are each modified based on the estimated distance between the corresponding MS and the FBS 116 being located. The larger ellipses 614, 624 and 634 represent the addition of these estimated distances to the dilution of precision error ellipses 612, 622 and 632, respectively.

The ellipses 614, 624 and 634 overlap in an area 640. The area 640 is common to all the ellipses 614, 624 and 634 is the most likely area where the FBS 116 is located. Trilateration methods can be used to estimate the FBS position 650 within the area 640. In one aspect, additional position fixes can be performed until a certain confidence level is reached (e.g., when the overlap area is smaller than a threshold). Since FBS's are not expected to move frequently, there may be hours, days or even weeks to calculate a reliable position. Other methods can also be employed to improve the accuracy of the position estimation of the FBS 116 at the block 350. For example, for cases where more than one overlap area exists, each overlap area may be ranked according to the number of measurements that overlap it and the area with the largest number can be chosen. The position estimation module 230 of the network controller 205 in FIG. 2 can perform the functions at t the block 350.

The examples illustrated in FIGS. 5 and 6 are depicted in two dimensions. However, the position determination algorithms can be implemented to provide a three dimensional location. This could be useful when the FBS 116 is located in a high-rise building including many floors, for example.

For cases where it is determined at decision block 330 that the MS does not have position capability (e.g., when a MS is not equipped with position capability, or when the SPS or network based positioning system is not available), the process 300 proceeds to block 345. At block 345, the positions of standard base stations and/or other FBS's are used to estimate the position of the FBS 116.

Cellular networks, such as WCDMA, and CDMA networks, for example, utilize pilot channels for base stations, including FBS's 116. Pilot channels typically contain information representing the identity of the base station. In one aspect, the position information obtained at the block 320 is information identifying the pilot channels of one or more base stations and/or FBS's being received by a MS 104 that is in communication with the FBS 116 being located.

In one aspect, the identity of the base stations can be used to look up the location of the base stations on a network database. The network database can also include coverage areas for the base stations. In this aspect the location of the MS can be estimated, at the block 345, using methods similar to the methods of identifying overlapping circles and ellipses of FIGS. 5 and 6 respectively. For example, the points 520, 530 and 540 would be the locations of three base stations for with the MS can receive pilots. The circle radii 512, 522 and 532 can be chosen to match a coverage area contained in the network database. Thus, trilateration methods can then be used to estimate the most likely position of the MS in the area 550 shown in FIG. 5. In another aspect, ellipses can be used to represent the coverage areas of the base stations 108. In yet another aspect, the wireless network database uses multiple geometries to represent the coverage areas and these geometries can be used to estimate the most likely position of the MS 104.

After the position of the MS 104 has been estimated, at the block 345, the position of the FBS can be calculated using methods similar to those discussed above in reference to the blocks 340 and 350. These methods can make use of the propagation loss between the MS and the FBS 116 as determined at the block 325.

The base stations 108 that the MS is receiving pilot signals from, can be base stations in the cellular network that the MS 104 is communicating in, or the base stations 108 can be of another network (e.g., another carrier's network that uses a similar cellular protocol as the MS's home network, or a network that uses a completely different protocol). In aspects where multiple network's base stations 108 are used, the network controller 205 that is performing the process 300 could use multiple databases to determine the base station locations. In these aspects, the information received at the block 320 would also include network information identifying the network to which the base stations belong.

In another aspect, the MS 104 can be in communication with other FBS's 116 and the locations of the FBS's 116 can be used along with or instead of the normal base station locations. In this aspect, the pilot identification information of the FBS's 116 that the MS 104 is receiving would be received at the block 320. In addition the MS 104 would also transmit RSSI (or propagation loss estimates) measurements that could be used to estimate the distances that the MS 104 is located from the multiple FBS's 116. The locations of the FBS's 116 could be locations that were previously determined using the method 300. In this aspect, methods similar to those discussed above in reference to FIGS. 5 and 6 can be used to estimate the location of the MS.

For example, using the circle method of FIG. 5, the points 510, 520 and 530 represent the locations of 3 FBS's from which the MS 104 receives pilot signals. The circle radii 512, 522 and 532 could be estimated based on three RSSI/propagation loss estimates, one for each FBS 116. The location of the MS 104 could then be estimated using trilateration methods. After the position of the MS 104 has been estimated, at the block 345, the position of the FBS 116 can be calculated using methods similar to those discussed above in reference to the blocks 340 and 350. These methods can make use of the propagation loss between the MS 104 and the FBS 116 as determined at the block 325.

In order to avoid identifying base stations that the MS is receiving at different times, due to motion of the MS 104, for example, the pilot data that is received at the block 320, should represent pilots that the MS 104 is receiving at approximately the same time. For example, the MS 104 could attach a time stamp to the pilot data that the MS transmits to the FBS 116 and is received by the network controller 205 at the block 320. In this way, the network controller 205 could avoid using pilot data that is obtained at significantly different times. For example, the network controller 205 could be configured to only use pilots that have a time stamp within one minute of each other. In this way, the motion of the MS could be limited. Other time ranges, such as 10 seconds, 20 seconds, 30 seconds, 40 seconds, 50 seconds and others could also be used by the network controller 205.

The FBS's 116 from which the MS 104 is receiving pilots can include other FBS's 116 that are not configured to provide access to the backhaul network for the MS 104. The MS 104 is not required to be provided full service by the other FBS's 116, but only be configured to receive their pilots. Similarly, the other FBS's 116 do not need to be configured to provide full service to the MS 104. The position estimation module 230 of the network controller 205 in FIG. 2 can perform the functions at the decision block 345.

A system and method for determining the location of a re-deployable base station is disclosed. The disclosed system and method allow for accurate determination of the position of an FBS using position information obtained from a MS that is communicating with the FBS being located. The position information can include the location of the MS as estimated using one or more SPS or cellular network based positioning systems. The position information can also include data identifying pilots from base stations and/or other FBS's that the MS is receiving. A determination of the propagation loss between the MS and the FBS can be used to estimate the distance between the MS and the FBS. The location of the FBS can then be determined based on the received position information and the determined distance between the MS and the FBS.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Persons of ordinary skill in the art may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method comprising:
    communicating with a re-deployable base station over a wireline network, the re-deployable base station being configured to communicate wirelessly with a mobile station, the mobile station being configured to communicate wirelessly with the re-deployable base station;
    obtaining information indicative of a position of the mobile station;
    determining a propagation loss between the mobile station and the re-deployable base station; and
    estimating a position of the re-deployable base station based on the obtained position information using a position location method determined according to the propagation loss.

2. The method of claim 1, wherein the obtained position information comprises an estimated position based on one or more of a satellite based position system, and a position system of the cellular communications network.

3. The method of claim 2, wherein the obtained position information further comprises a plurality of position and dilution of precision estimations for the mobile station, the plurality of position and dilution of precision estimations being obtained at different times, the method further comprising estimating the position of the re-deployable base station based on the plurality of position and dilution of precision estimations.

4. The method of claim 1, wherein the obtained position information comprises information identifying one or more base stations of a first wireless network that the mobile station receives pilot signals from, the method further comprising:
    obtaining position information associated with positions of the one or more base stations; and
    estimating the position of the re-deployable base station based on the positions of the one or more base stations.

5. The method of claim 4, wherein at least one of the one or more base stations that the mobile station receives pilot signals from is another re-deployable base station.

6. The method of claim 4, wherein the one or more base stations comprise at least one base station operating in a second wireless network, the second wireless network being a different wireless network than the first wireless network.

7. The method of claim 4, wherein the obtained position information comprises information identifying two or more base stations of the first wireless network that the mobile station receives pilot signals from, the method further comprising:
    determining areas of coverage for the two base stations; and
    estimating the position of the re-deployable base station based additionally on the areas of coverage.

8. The method of claim 1, further comprising:
    issuing a position fix command to the mobile station; and
    obtaining the position information subsequent to issuing the position fix command.

9. The method of claim 1, wherein the re-deployable base station is further configured to provide service to a restricted number of mobile stations.

10. The method of claim 1, wherein the estimating further comprises:
    comparing the propagation loss to a threshold; and
    estimating the position of the re-deployable base station as the position of the mobile station if the propagation loss is less than the threshold.

11. The method of claim 1, wherein the estimating further comprises:
    comparing the propagation loss to a threshold; and
    if the propagation loss is less than the threshold, collecting a plurality of location fixes corresponding to at least one mobile station and estimating the position of the re-deployable base station as a function of the plurality of location fixes.

12. The method of claim 11, wherein the estimating further comprises:
    identifying propagation losses associated with each of the location fixes;
    determining radii of uncertainty for each of the location fixes based on the propagation losses;

forming a constellation of position locations based on the location fixes and the radii of uncertainty; and estimating the position of the re-deployable base station by identifying a region of overlap between the radii of uncertainty within the constellation of position locations.

13. The method of claim 1, wherein the estimating further comprises:

comparing the propagation loss to a threshold; and if the propagation loss is greater than the threshold, estimating the position of the re-deployable base station by:

collecting a plurality of positions for at least one mobile station;

identifying propagation losses associated with each of the positions;

determining dilution of precision associated with the positions based on the propagation losses;

forming a constellation of error ellipses based on the positions and the dilution of precision associated with the positions; and estimating the position of the re-deployable base station by identifying a region of overlap between the error ellipses.

14. A network controller comprising:

a receiver configured to communicate with a re-deployable base station over a wireline network, the re-deployable base station being configured to communicate wirelessly with a mobile station, the mobile station being configured to communicate wirelessly with the re-deployable base station;

a processor coupled to the receiver and configured to obtain information indicative of a position of the mobile station;

a received signal strength indicator module configured to determine a propagation loss between the mobile station and the re-deployable base station;

a position estimation module coupled to the processor, the position estimation module configured to estimate a position of the re-deployable base station based on the obtained position information using a position location method determined according to the propagation loss.

15. The network controller of claim 14, wherein the obtained position information comprises an estimated position based on one or more of a satellite based position system, and a position system of the cellular communications network.

16. The network controller of claim 15, wherein the obtained position information further comprises a plurality of position and dilution of precision estimations for the mobile station, the plurality of position and dilution of precision estimations being obtained at different times, the position estimation module being further configured to estimate the position of the re-deployable base station based on the plurality of position and dilution of precision estimations.

17. The network controller of claim 14, wherein the obtained position information comprises information identifying one or more base stations of a first wireless network that the mobile station receives pilot signals from, wherein the processor is further configured to obtain position information associated with positions of the one or more base stations, and the position estimation module is further configured to estimate the position of the re-deployable base station based on the positions of the one or more base stations.

18. The network controller of claim 17, wherein at least one of the one or more base stations that the mobile station receives pilot signals from is another re-deployable base station.

19. The network controller of claim 17, wherein the one or more base stations comprise at least one base station operating in a second wireless network, the second wireless network being a different wireless network than the first wireless network.

20. The network controller of claim 17, wherein the obtained position information comprises information identifying two or more base stations of the first wireless network that the mobile station receives pilot signals from, the position estimation module being further configured to determine areas of coverage for the two base stations, and estimate the position of the re-deployable base station based additionally on the areas of coverage.

21. The network controller of claim 14, further comprising a transmitter configured to issue a position fix command to the mobile station, and wherein the processor is further configured to obtain the position information subsequent to issuing the position fix command.

22. The network controller of claim 14, wherein the re-deployable base station is further configured to provide service to a restricted number of mobile stations.

23. A network controller comprising:

means for communicating with a re-deployable base station over a wireline network, the re-deployable base station being configured to communicate wirelessly with a mobile station, the mobile station being configured to communicate wirelessly with the re-deployable base station;

means for obtaining information indicative of a position of the mobile station;

means for determining a propagation loss between the mobile station and the re-deployable base station; and means for estimating a position of the re-deployable base station based on the obtained position information using a position location method determined according to the propagation loss.

24. The network controller of claim 23, wherein the obtained position information comprises information identifying one or more base stations of a first wireless network that the mobile station receives pilot signals from, the means for obtaining obtains position information associated with positions of the one or more base stations, and the means for estimating estimates the position of the re-deployable base station based on the positions of the one or more base stations.

25. The network controller of claim 24, wherein the obtained position information comprises information identifying two or more base stations of the first wireless network that the mobile station receives pilot signals from, the means for estimating determines areas of coverage for the two base stations and estimates the position of the re-deployable base station based additionally on the areas of coverage.

26. A non-transitory computer readable medium encoded with computer executable instructions for executing a method, the method comprising:

communicating with a re-deployable base station over a wireline network, the re-deployable base station being configured to communicate wirelessly with a mobile station, the mobile station being configured to communicate wirelessly with the re-deployable base station;

obtaining information indicative of a position of the mobile station;

determining a propagation loss between the mobile station and the re-deployable base station; and estimating a position of the re-deployable base station based on the obtained position information using a position location method determined according to the propagation loss.

27. The non-transitory computer readable medium of claim 26, wherein the obtained position information comprises information identifying one or more base stations of a first wireless network that the mobile station receives pilot signals from, the computer readable medium further comprising instructions for:
- obtaining position information associated with positions of the one or more base stations; and
- estimating the position of the re-deployable base station based on the positions of the one or more base stations.

28. The non-transitory computer readable medium of claim 27, wherein the obtained position information comprises information identifying two or more base stations of the first wireless network that the mobile station receives pilot signals from, the computer readable medium further comprising instructions for:
- determining areas of coverage for the two base stations; and
- estimating the position of the re-deployable base station based additionally on the areas of coverage.

29. A method of locating a re-deployable base station, the re-deployable base station being part of a wireless cellular communications network and being configured to provide service to a limited number of mobile stations, the method comprising:
- transmitting a position fix command to one of the mobile stations;
- subsequent to transmitting the position fix command, receiving information indicative of a location of the mobile station;
- determining an indication of an amount of propagation loss between the mobile station and the re-deployable base station; and
- estimating the position of the re-deployable base station based on the received information and the determined propagation loss using at least one position location method determined according to the determined propagation loss.

* * * * *